United States Patent [19]

Ansberg et al.

[11] 4,085,357

[45] Apr. 18, 1978

[54] SYNCHRONOUS SWITCHING MEANS FOR OPERATING CABLE MARKING APPARATUS

[75] Inventors: Chris Ansberg, Vaihingen; Klaus Maisel, Aurich, both of Germany

[73] Assignee: International Standard Electric Corporation, New York, N.Y.

[21] Appl. No.: 658,215

[22] Filed: Feb. 17, 1976

[30] Foreign Application Priority Data

Feb. 18, 1975 Germany ............................ 2506762

[51] Int. Cl.$^2$ ............................................ G05B 11/18

[52] U.S. Cl. .................................... 318/590; 328/154

[58] Field of Search ............... 318/562, 590, 591, 594, 318/615; 328/133, 152, 154; 307/247 R

[56] References Cited

U.S. PATENT DOCUMENTS

| | | | |
|---|---|---|---|
| 3,539,933 | 11/1970 | White | 328/154 |
| 3,552,308 | 1/1971 | Minehart | 101/37 |
| 3,788,213 | 1/1974 | Brown et al. | 101/37 |

*Primary Examiner*—Robert K. Schaefer
*Assistant Examiner*—John J. Feldhaus
*Attorney, Agent, or Firm*—John T. O'Halloran; Thomas M. Marshall

[57] ABSTRACT

This application discloses cable length measuring apparatus for accurately determining the length of cable at spaced locations by utilizing at least two sets of measuring devices driven by the cable. Electronic switching means receive the length data from each of the measuring devices and processes that data into a command to a cable length marking means. The circuitry of the switch means automatically determines the most favorable instant to cause switching of the measurements of one of the measuring devices to create the command to the marking device to the other of the measuring devices in order to avoid any damage to the cable's jacket because of the switching between the two measuring devices.

4 Claims, 2 Drawing Figures

SYNCHRONOUS SWITCHING MEANS FOR OPERATING CABLE MARKING APPARATUS

BACKGROUND OF THE INVENTION

1. Field of the Invention

Cable marking devices.

2. Prior Art

Various devices have been proposed in the prior art for marking cables and specifically devices for putting length markings on the plastic covering of the electric cables by marking meters, feet, or yards at precise locations on the jacket of the cable. It is found in the prior art that it is advantageous to measure the running length of the cable at a location prior to extrusion of the plastic jacket by accurately determining the length of the core and using that length measurement to operate a cable marker positioned immediately following the extruder so that the length mark is applied to the jacket of the cable while the jacket of the cable is still soft. In published German application 1,465,840, such a device is disclosed wherein the length measurement of the cable is carried out in front of the screw extruder by means of two measuring wheels which are in contact with the core so as to be rotated by the cable core. The measuring result of the two measuring wheels is mechanically or electrically transmitted to the marking apparatus. There are two outstanding disadvantages to the device illustrated in published German application 1,465,840 insofar as length marking is concerned. One is that the measuring results are obtained in front of the extruder. Thus at the end of the cable when there is no cable core between the measuring wheels no measuring data is obtained and transmitted. Consequently no markings are produced on the end of the cable. Another disadvantage comes about because the length is measured on the cable core which in most cases is not sufficiently uniform and therefore provides no accurate measuring data which is a prerequisite of accurate cable marking.

Other proposals include U.S. Pat. Nos. 3,552,308; 2,739,528; 3,711,757; and 3,788,312. Each of the referenced U.S. patents performs a similar operation but utilizes different structure and has disadvantages which the device of this invention overcomes.

SUMMARY OF THE INVENTION

The device of the present invention provides for marking the running meter indicia on the outer plastic jacket of an electric cable utilizing a marking apparatus located immediately behind the screw extruder which provides the cable core with an outer jacket, at a location where the plastic jacket is still soft. A cable length measure device means, located at a substantial distance from and electrically coupled to the marking apparatus, are controlled by the cable to provide at least two independent measurements of the rnning cable's length.

During the application of the markings to the outer plastic jacket of the electric cable, as described above, it has proved advantageous that, as the prior art teaches, to mark the cable jacket at a point immediately behind the screw extruder while the jacket is not yet cured or hardened. In order to provide for consecutive length marks on the cable jacket it is necessary to measure the length of the cable at a place where the jacket is hardened and to transmit the information obtained by the measurement to the marking apparatus in order to control the application of its marks to the soft jacket.

It is therefore the object of this invention to provide an apparatus for marking running meter indicia on the outer plastic jacket of an electric cable which apparatus provides highly accurate measuring results for control of the marking apparatus and ensures the jerk free marking by the apparatus. Accordingly, the device of this invention includes at least two selectively connectable spaced apart length measuring devices positioned along the cable which are each connected to the marking apparatus via a novel switching device which automatically determines the most favorable switching instant and performs a preselected switching operation. The length measuring devices are each preferably incremental synchro generators coupled to an apparatus which is driven by the cable without slipping. Preferably the switching device is a three stage electronic circuit whose first stage generates like signals from the output signals of the length measuring devices and compares them and whose second stage generates a signal determined by a preselected switching condition and the conditions of the first stage. Electrical gates provided in the third stage are opened by a signal from each of the first stage and the second stage to provide a command signal to the marking apparatus. The conditions of the second stage which are preselected is that favorable moment at which switching between the measuring device can be accomplished without interrupting the movement of the cable.

DESCRIPTION OF THE PREFERRED EMBODIMENTS

Figure 1:
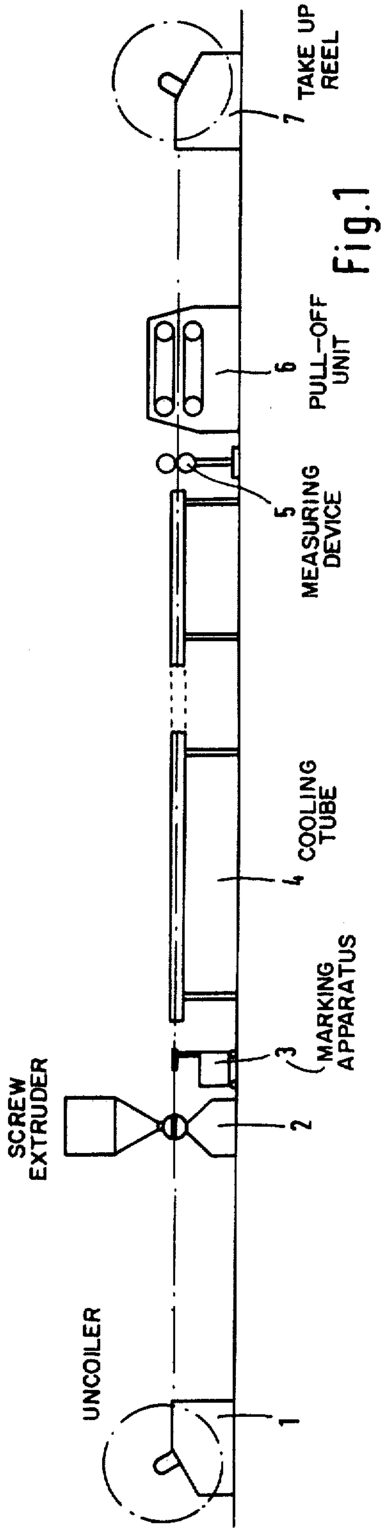
FIG. 1 is a diagrammatic illustration of an installation for producing the outer plastic jacket of an electric cable illustrating the position of marking apparatus and length measuring devices controlling the marking apparatus.

Referring to FIG. 1 illustrating an installation for producing the outer plastic jacket of an electric cable, the various units are arranged in a known manner in the direction of the movement of the cable as it is jacketed. An uncoiler 1 is provided from which the cable core is pulled off and fed to a screw extruder 2. At that location the cable coil is provided with an outer plastic jacket. A marking apparatus 3 positioned immediately behind the screw extruder 2 provides the still hot and therefore soft cable jacket with length marks. The marking apparatus 3 is operated by signals to be described below. A cooling tube 4 is provided in which the cable jacket is cooled down to substantially room temperature. A measuring device 5 positioned as indicated consists essentially of a pair of measuring wheels driven by the cable insofar as possible. The measuring wheels of measuring device 5 contact the cable in such a way that they do not slip. Accordingly the measuring device 5 generates a signal which corresponds to the actual cable length which signal is used as described below for controlling the operation of the marking apparatus 3. A pull-off unit 6, illustrated as driven endless belts pulls off the jacketed cable by the slip free contact of the jacketed cable between endless belts. There is also provided a take-up reel 7 on which the completed cable is wound.

It should be understood that experience has indicated that accurate length measurement of the cable is ensured only if the length measuring device is in close contact with the cable and is operated without any slip and operates synchronously with the longitudinal movement of the cable. Accordingly, the apparatus of this invention includes at least two length measuring devices, interconnected by an electronic switching means illustrated below so that one of the two devices is always selectively connected to the marking apparatus which best fulfills the accurate measuring conditions.

In the embodiment illustrated in FIG. 1 the two length measuring devices 5, 6, are provided in the location illustrated, i.e., one before the pull off unit 6 and one associated with and operated by the pull off unit 6. In the embodiment illustrated, each of the length measuring devices 5, 6 consist of an incremental synchro generator. The synchro generators are coupled respectively with the shaft of one of the measuring wheels of the measuring device 5 and with the shaft of one of the wheels moving the endless belts in the pull off unit 6. An incremental synchro generator is a photoelectric synchro generator with built-in pulse shaper which generates a given number of electrical pulses per revolution. A commercially available incremental synchro generator is the ROD 500 manufactured by Dr. Johannes Heidenhain GmbH, 8225 Traunrent, W. Germany. In the above described apparatus a given number of electrical pulses generated by the incremental synchro generator corresponds to a given unit length, for example one meter so that the pulses can be counted and after the number of pulses corresponding to one meter has been obtained the marking apparatus receives from the counter a control pulse which advances the counting mechanism at the marking apparatus by one number and causes the cable jacket to be marked with that number. Thus it will be understood that the known marking apparatus includes progressively operated marking indicia which marks provide numerical indications of the cable length in the soft cable jacket.

It should also be understood that the electric pulses generated by the incremental synchro generator, of which a given number of such pulses corresponds to a preselected unit length, for example one meter, can also be used to control a stepper motor driving a drum-like marking apparatus. If the drum has a circumference of one meter, for example, the stepper motor can be directly controlled by the number of pulses corresponding to one meter of cable in a manner so that the drum like marking apparatus performs one revolution. It is also possible in this case to use other means to advance the counting mechanism by one number during one revolution.

As described above, the apparatus of this invention includes incremental synchro generators as length-measuring devices. However, the incremental synchro generators may be replaced with analog synchro generators without any basic change in the operation of the device of this invention.

When the apparatus described above was utilized to mark the jackets of certain cables, it was learned that it was an advantage to measure the length of the cable with the length measuring device operated by one of the wheels of the pull off unit 6 at the beginning of the jacketing operation. In other words, when there is no jacketed cable at the measuring device 5. The beginning of the cable is being pulled off the uncoiler and through the screw extruder 2 and the cooling tube 4 by means of a pulling rope. The pulling rope being operated by the pull off unit 6 would provide accurate length measurement command to the marking apparatus until such time as jacketed cable is available at the measuring device 5. Only when the jacket cable is available at the measuring device 5 will a changeover take place so that the output of the measuring device 5 will control the operation of the marking device 3.

It should be understood with another type of cable, for example armored cable, it may be advantageous to constantly measure the length of the cable by means of the length-measuring device in the pull off unit 6. In still another possible application it should be understood that one of the two length measuring devices may be positioned between the uncoiler 1 and the screw extruder 2.

In any of the above cases, however, it is impossible to switch from one length measuring device to another without causing a control signal transient because the length-measuring devices do not run so synchronously that their length-dependent output pulses are congruent. We have found that a simple change-over switch may lead to a disturbance in the drive of the marking apparatus and thus cause damage to the soft cable's jacket.

Figure 2:
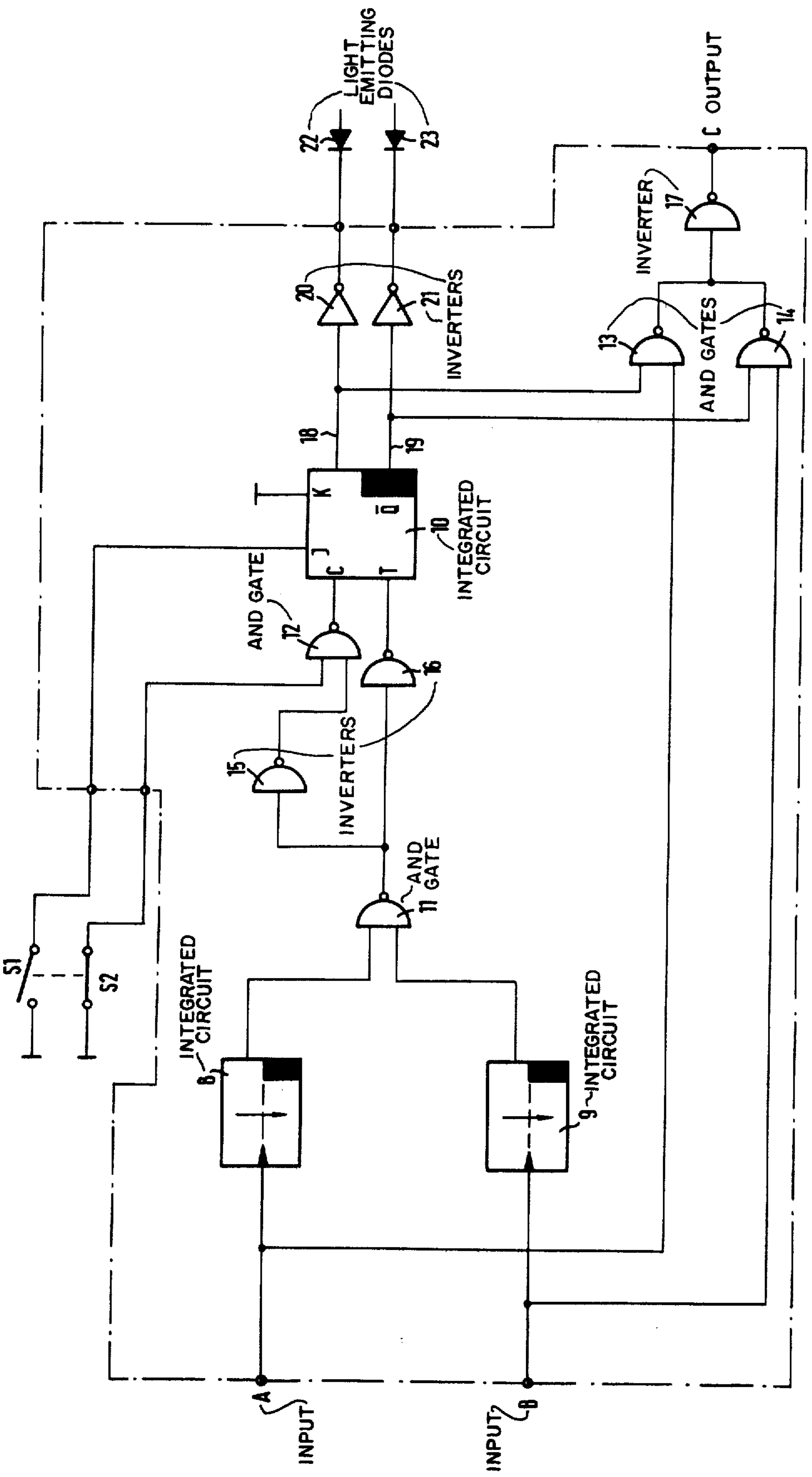
FIG. 2 is an electronic block diagram of the switching device of this invention.

Accordingly, we have provided for jerk free switching which is operated by the switch device shown schematically in FIG. 2 the purpose which is to determine the most favorable time for the switch-over and to cause the switching to occur automatically at that most favorable instant.

The switching device illustrated in FIG. 2 is an electronic circuit with two inputs A, B and output C. The pulses generated by the synchro generator coupled to the measuring device 5 for example, square-wave pulses, are applied via input A while the input B receives the pulses generated by the synchro generator coupled to the pull off unit 6 for example. The output C provides pulses which synchronize the marking apparatus with the cable take-off speed. As seen in FIG. 2, the circuit arrangement consists essentially of integrated circuits 8, 9, 10; NAND gates 11, 12, 13 and 14; and inverters 15, 16 and 17. For control of the circuit arrangement, a change-over switch, consisting of coupler switches S1 and S2 is provided. The integrated circuits 8 and 9 are monoflops, while the integrated circuit 10 is a controllable storage network, the so-called master-slave flip-flop.

The operation of the circuit arrangement in FIG. 2 will be explained for an operation condition with the following starting conditions:

1. The square-wave pulses generated by the synchro generator of the measuring device 5 are applied to the input A.

2. The square-wave pulses generated by the synchro generator of the pull off unit 6 are applied to the input B.

3. The switch position shown (S1 open, S2 closed) corresponds to an instruction that control pulses, synchronous with the pulses generated by the synchro generator of the measuring device 5, are to appear at the output C.

4. Changeover from the NAND gate 14 to the NAND gate 13 has not taken place yet.

In the integrated circuits 8, and 9 square-wave pulse trains with a pulse width of about 1 $\mu$ s are generated from the pulses supplied by the synchro generators of the length-measuring device 5 at input A and of the pull-off unit 6 at input B respectively. When both pulse trains are synchronous, the NAND gate 11 will open. The pulses appearing at the output of the NAND gate 11 are inverted in the inverter 16 and applied to the input T of the integrated circuit 10. The input C of integrated circuit 10 is inhibited because one input of the NAND gate 12 is grounded via S2. In this case the output 18 of integrated circuit 10 is "high" and the output 19 is "low". As a result, the NAND gate 14 is closed, and the NAND gate 13 is opened. The instruction entered by the switch position (S1, S2) in accordance with paragraph number 3 above has been executed and this is at an instant at which both inputs A and B were in synchronism.

If by closing S1 and opening S2, the switching device is given a different instruction, the circuit arrangement will work analogously and switch from the NAND gate 13 to the NAND gate 14 at the appropriate instant. The outputs 18, 19 of integrated circuit 10 are followed by inverters 20 and 21 which act as indicating amplifiers and whose outputs are associated with visual indicating means 22, 23 which may, for example, be light emitting diodes as illustrated in FIG. 2. The visual indicating means 22, 23 will provide a visual indication of which of the input signals is being utilized to generate the output signal for controlling the operation of the marking apparatus 3.

While the specification arrangement and circuit has been illustrated, it will be understood that modifications may be made without departing from the scope of the appended claims.

What is claimed is:

1. In an apparatus for marking a running length indication on the outer plastic jacket of an electric cable at a location immediately behind a screw extruder which provides the cable core with an outer jacket, cable length measuring means located at a distance from and electrically coupled to said marking apparatus controlled by the running length of said cable including at least two selectively connectable, spaced apart length measuring devices positioned along the cable, each of which is connected to the marking apparatus by switching means including circuitry for automatically determining the most favorable switching instant and for performing said preselected switching operation to control said marking apparatus.

2. The apparatus as set forth in claim 1 wherein each of said length measuring means comprises an incremental synchro generator coupled to devices driven by said cable without slip.

3. The apparatus as set forth in claim 2, wherein one of said incremental synchro generators is coupled to a portion of a pull off unit and the other of said length measuring means is coupled to a separate measuring device.

4. The apparatus as set forth in claim 1 wherein said switching means is a multi-stage electronic circuit having a first stage for generating like signals in the output signals of the said length measuring means and compares them, a second stage for generating a signal as a function of preselected conditions and of the conditions of the first stage, and a third stage which includes electrical gates, one of which is opened by the signal generated by said first stage and said second stage.

* * * * *